United States Patent [19]

Bekker-Madsen

[11] Patent Number: 4,985,096

[45] Date of Patent: Jan. 15, 1991

[54] METHOD FOR DISPENSING OF LABELS

[75] Inventor: Per Bekker-Madsen, Vojens, Denmark

[73] Assignee: R. Ancker Jorgensen A/S, Birkerod, Denmark

[21] Appl. No.: 411,301

[22] Filed: Sep. 22, 1989

[30] Foreign Application Priority Data

Sep. 22, 1988 [DE] Fed. Rep. of Germany ....... 3832239
Aug. 23, 1989 [DE] Fed. Rep. of Germany ....... 3927821

[51] Int. Cl.$^5$ .............................................. B32B 31/00

[52] U.S. Cl. ...................................... 156/64; 156/353; 156/354; 156/361; 156/364; 156/521

[58] Field of Search ............... 156/517, 528, 529, 519, 156/521, 522, 548, 556, 566, 569, 570, 571, 573, DIG. 35, 64, 353, 354, 361, 364; 118/221, 227

[56] References Cited

U.S. PATENT DOCUMENTS

| | | | |
|---|---|---|---|
| 2,850,195 | 9/1958 | Van Dam, Jr. | 156/566 X |
| 3,322,597 | 5/1967 | Della Vite | 156/DIG. 35 X |
| 3,565,728 | 2/1971 | Alton | 156/566 |
| 4,354,894 | 10/1982 | Lewis et al. | 156/517 |
| 4,468,274 | 8/1984 | Adachi | 156/566 X |

*Primary Examiner*—Michael W. Ball
*Assistant Examiner*—Mark A. Osele
*Attorney, Agent, or Firm*—Arthur B. Moore

[57] ABSTRACT

A series of labels for the labelling of goods are separated from a strip which consists only of the labels. The labels are rendered actively adhesive on their rear sides before they reach the goods.

1 Claim, 2 Drawing Sheets

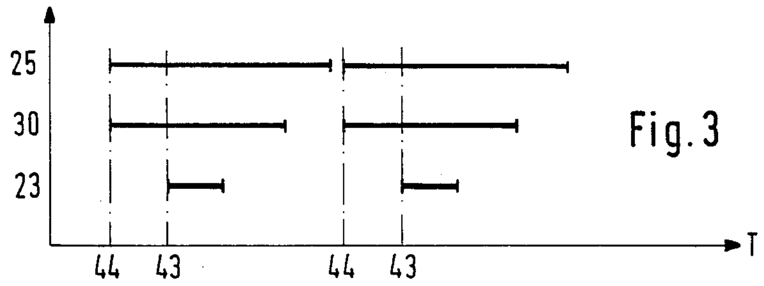
Fig. 3
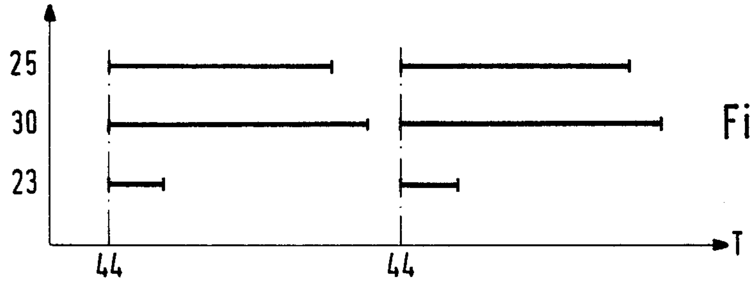
Fig. 4
Fig. 5
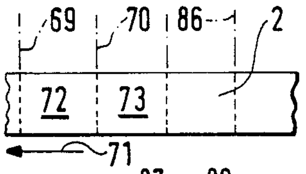
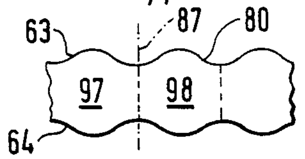
Fig. 6
Fig. 7
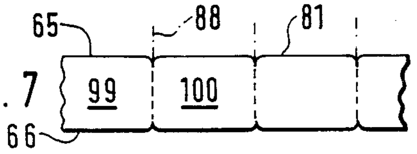
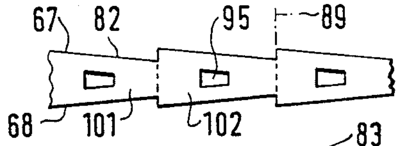
Fig. 8
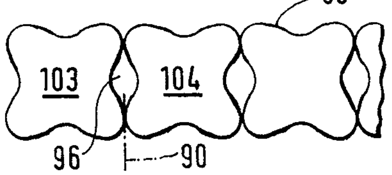
Fig. 9
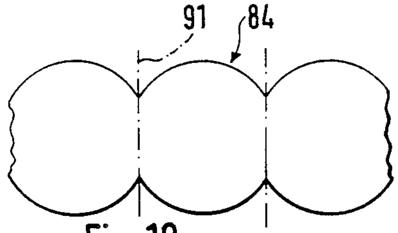
Fig. 10
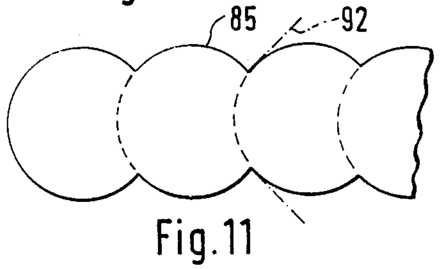
Fig. 11

METHOD FOR DISPENSING OF LABELS

The invention concerns a method for dispensing labels, which are coated so as to be capable of adhesion on the rear side, are obtained from a supplied strip of labels, and are released individually to a labelling position, and which are glued onto a product which is held ready there; together with a strip of labels and a device to implement this method.

In a labelling machine known from U.S. Pat. No. 4,224,872, the strip of labels consists of a backing strip, to which the labels, backed with a self-adhesive coating, are temporarily stuck. Such strips of labels are costly. The task of the invention is to improve on a method and device of the sort described above, in such a way that they can be operated with simpler and less costly strips of labels.

SUMMARY OF THE INVENTION

A method which accomplishes this task has the following characteristics: a strip of labels is used which consists only of the consecutively arranged labels, without gaps; the labels are obtained by separating a corresponding section of the strip of labels for each label; the individual labels obtained in this manner are then rendered actively adhesive on the rear side, consecutively and individually, by the application of adhesive or by the activation of an inactive adhesive coating applied previously to the strip of labels; and the labels rendered capable of adhesion are then released to the labelling position individually and are glued onto the product.

The lables, and hence the strip of labels, consist preferably of paper. Other sheet material may however also be considered, for example plastic, metal foil, or sheets of textile material.

Since the strip of labels consists exclusively of the labels, it is adequate to cut these off at the front end of the strip of labels, in order to obtain the labels ready for use, without any waste at all.

A label is stuck onto the product with as little delay as possible after it has become actively adhesive, in order that the adhesive does not lose its activation in the meanwhile.

In the strip of labels, it is preferable for two immediately consecutive labels to adjoin one another alone the line which extends transversely across the strip of labels. In order to separate a label, it is then adequate to cut it off along this separating line. This can be achieved by means of punching, welding, melting, cutting, application of a penetrative gas beam or the like.

The external contours of the labels may vary extensively. This can be achieved by including both edges of the strip of labels in the outline of the labels, and/or by providing recesses in the outline of the labels which are preferable located between the separating lines. The important point is that the strip of labels is adequately stable throughout.

BRIEF DESCRIPTION OF THE DRAWING

The invention is now explained in more detail using the appended drawing.

In the drawing:

FIG. 3 shows an operating diagram for FIG. 1;

FIG. 4 shows a modified operating diagram as compared to FIG. 3; and

FIG. 5–11 show various forms of strips of labels.

DETAILED DESCRIPTION

Figures 1, 2:
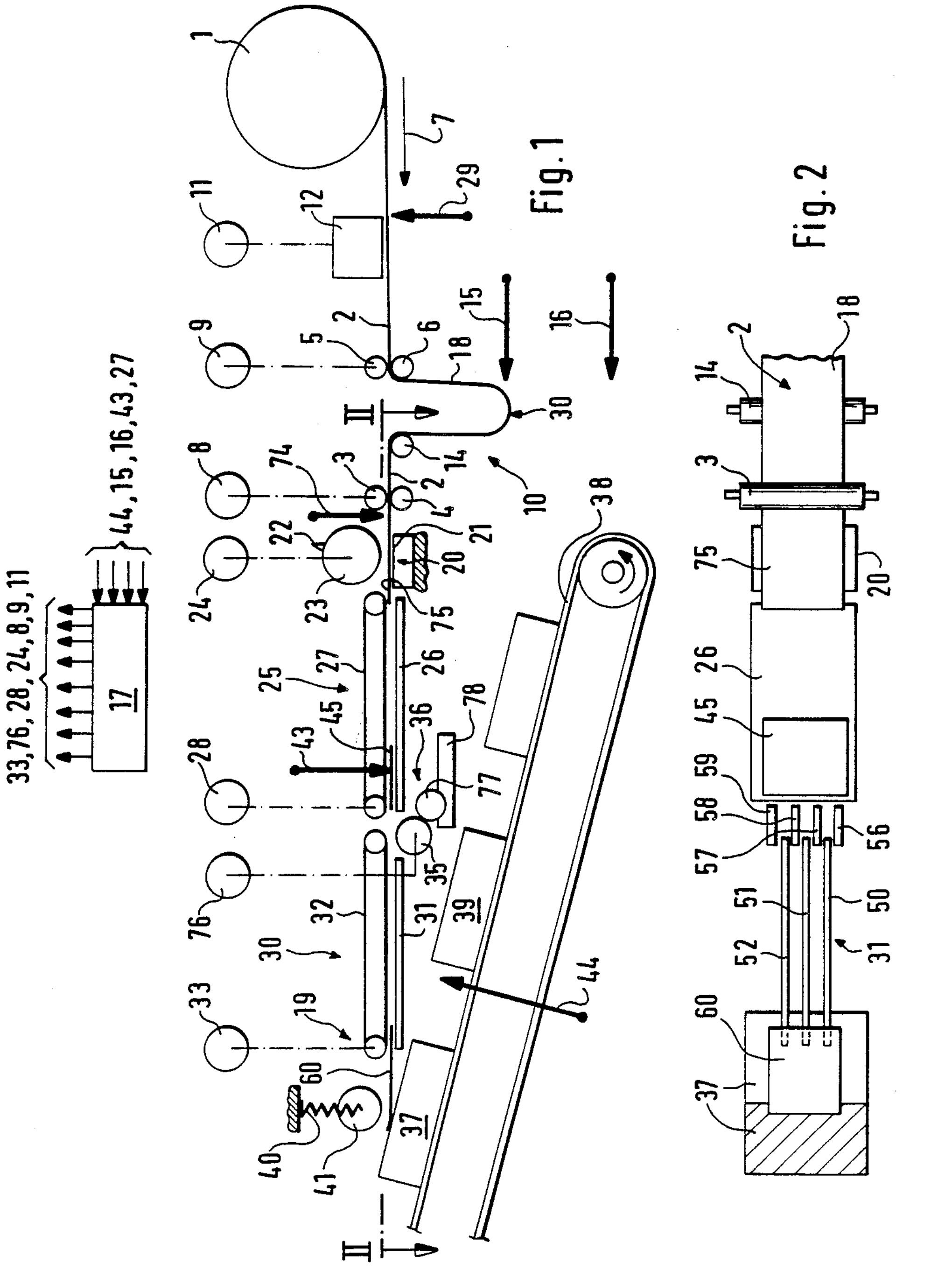
FIG. 1 shows a schematic representation of a for dispensing labels with activated adhesive.
FIG. 2 shows parts of FIG. 1 viewed in the direction of arrow II.

Referring to FIG. 1, 1 designates a label strip reel, around which a supply of label strip 2 is wound. The label strip 2 is conveyed in each case between pairs of rollers 3, 4, and 5, 6 in the direction of arrow 7. Rollers 3 and 5 are driven by drives 8 and 9. Rollers 3 to 6 form the label strip conveyor designated as a whole by 10. A printer 12, driven by a drive 11, is assigned to this label strip conveyor; the printer is directed at the upper side of the strip of labels shown uppermost in FIG. 1, and a measuring sensor 29 is assigned to it. In addition, a loop-former is assigned to the label strip conveyor 10; the loop-former is constituted by rollers 5 and 6 and reversing roller 14, and the strip of labels is guided into a loop of greater or smaller length. If the length of the loop is less than the length shown if FIG. 1, a measurement sensor 15 gives a signal to this effect. If the loop exceeds a considerably greater length, a second measurement sensor 16 located further below gives a signal. These signals reach the central control unit 17. A transverse cutter 20 is also assigned to the label strip conveyor 10. This transverse cutter consists of a sliding surface 21 underneath the strip of labels, on which the start of the strip of labels 2 is pushed forward by means of the pushing effect of rollers 3 and 4.

In addition, the transverse cutter features a transverse cutter roller 23 on rotating bearings, which includes a cutting blade 22 extending over the entire width of the strip of labels. The transverse cutting roller is driven by drive 24, so as to make one complete revolution in each case. A first label conveyor section 25 is positioned after transverse cutter 20; this first label conveyor section consists of a lower sliding surface 26 and an endless conveyor belt 27 positioned above it, and which can be driven by drive 28. Positioned after label conveyor 25 is a second label conveyor section 30 which consists of a sliding surface 31, positioned as an extension to sliding surface 26, and an endless conveyor belt 32 positioned above it, and which can be driven by drive 33. Label conveyor section 30 leads to the label dispenser 19.

Between the two sliding surfaces 26 and 31, there is a gluing roller 35, assigned to a gluing mechanism designated as a whole by 36, which protrudes into a gap between the two sliding surfaces 26 and 31. However, the upstream end of conveyor belt 32 is located above this gap. The free end of sliding surface 31 is directed at a product 37 which is located at the labelling position. This product is one of a series of products 37, 39 carried separately and consecutively through the labelling position on a conveyor belt 38. Above the product 37 located in the labelling position is a pressure roller 41 tensioned by a pressure spring 40.

The drives 8, 9, 11, 24, 28, and 33 are controlled from the central control unit 17. The central control unit 17 is for its part also controlled by sensors 43, 44 and 74. Sensor 43 is directed at a label which is located in the 'ready' position.

Sensor 44 is directed at a product, for example product 39, which is en route to the labelling position. Sensors 29 and 74 are directed at a mark which is printed on or punched into the strip of labels 2, or at a mark resulting from the contour of the cut; these marks are assigned uniquely to the individual labels.

As can be seen from FIG. 2, the sliding surface 31 consists of several sliding rods 50, 51 and 52, positioned at a distance from one another. The glue roller consists of gluing disks 56, 57, 58 and 59, positioned at a distance from one another and of the same size, which are aligned with the gaps between the sliding rods. In this way, it is ensured that no glue can reach the conveyor belt 32 from the entire glue roller 35. A label which is being conveyed between the glue roller and the conveyor belt 32 is glued in strips, corresponding to the positioning of the gluing disks; then, as the unglued portions located between the glued strips pass over the sliding rods 50, 51, 52, the label slided to the labelling position, at which label 60 is located in the drawing. The two outer gluing disks 56 and 59 are located outside of sliding surface 31, so that the outer edges of the label are glued.

At the labelling position, the label 60 is brought into contact with the product; its rear, glued side adheres to the product and is pressed against it there by the pressure roller 41. It is drawn along following the onward movement of the product 37, pulled through and under pressure roller 41, and is thur roller and stuck firmly on to the product.

As is shown in FIG. 5. the strip of labels 2 is a long, uniform strip of paper consisting only of individual labels arranged in consecutive order, for example the labels 72, 73.

The labels adjoin along lines 69, 70 which extend perpendicularly to the direction of length, transversely across the strip of labels in accordance with arrow 71. The labels are of geometrically identical form and are already printed in label strip reel 1 and/or are printed in the printer 12. The strip of labels is pulled from the label strip reel by the drive of rollers 3 and 5, until the free and 75 is standing in the transverse cutter. The feed of label strip pulled by roller 5, is effected in such a manner that the length of loop 18 is no shorter than the value corresponding to sensor 15 and no longer than the value corresponding to sensor 16. In this way, the speed of advance in the area of the printer is independent of the speed of advance in the area of roller 3. During operation, the glue roller rotates constantly, driven by a drive 76. It is in overall contact with a coaxial glue transmission roller 77, the bottom part of which dips into a glue supply container 78, so that the entire glue roller 35 is constantly coated with a uniform coat of glue.

FIGS. 3 and 4 give operating diagrams for two different types of operation. On the horizontal axis, time T is represented; reference numbers 43S and 44S designate the signals from sensors 43 and 44. Unbroken lines show for how long the individual mechanisms 23, 25 and/or 30 are switched on. As soon as a requirement signal is given from sensor 44, compare FIG. 3, label conveyor sections 25 and 30 are set in operation. Label conveyor section 25 immediately advances label 45, which has until then been kept stationary at the 'ready' position, past the gluing mechanism 36 to label conveyor section 30, and this label conveyor section carries the label, now coated with glue, to the 'ready' position which is occupied by label 60 in the drawing, so that this label is glued to the product 39 which has meanwhile arrived at the 'ready' position. As soon as label 45 has left its 'ready' position, sensor 43 gives a requirement signal b, by means of which the transverse cutter 20 is triggered to start a cycle in which it cuts off the last label from the end 75 of the strip of labels. This label is released to label conveyor section 25 by the rotation of the transverse cutter, and from here it arrives the the 'ready' position, which was originally occupied by label 45. As soon as label 45 reaches the labelling position, label conveyor section 30 is halted, and as soon as the newly-cut label reaches the 'ready' position, label conveyor section 25 is switched off. Shortly after transverse cutter 20 has ended its cycle, driven roller 3 moves the strip of labels further forward by a step of one label, so that the next label is ready for cutting in the transverse cutter, as shown for label 75.

The 'ready ' position, which is occupied by label 45 in FIG. 1, ensures that a label is always glued only just before it reaches the product, so that the glue applied cannot dry out in the meantime.

As a modification to the mode of operation described, it is possible to dispense with the 'ready' position. This makes the control rather simpler, but the sequence of cycles is rather slower. This modified method of operation corresponds to the diagram according to FIG. 4. The only difference compared to FIG. 3 is that the requirement signal from sensor 44 sets the transverse cutter 20 in operation; the transverse cutter then cuts off a new label, which then immediately passes the 'ready' position without a pause, and reaches the labelling position, en route to which it is also glued, as in the mode of operation according to FIG. 4.

Instead of coating the labels with a layer of glue before they reach the goods, it is also possible to use strips of labels which feature an adhesive layer which is as yet inactive but which can be activated, such as a dry coat of glue which is activated by application of moisture. In such a case, a moistening device is used instead of the gluing device.

Instead of using a dry adhesive which must be moistened in order to be activated, it is also possible to use a meltable adhesive, which must be heated in order to be activated. Instead of applying glue and moisture, it is also possible to spray them on.

FIGS. 6 to 11 show different forms of strips of labels 80–85. All of these have as a common feature the fact that they consist of consecutively arranged, identically shaped labels 97 to 104, which are firmly joined to one another and are only detached by means of separation, such as cutting. No waste is caused as a result of this. In the case of strips of labels 2, 80, 81, 82, 83 and 84, the separating cut is made along a straight line 86–91. which extends perpendicularly to the length of the strip of labels in question. In the case of strip of labels 85, curved line 92 is used. In the case of strips of labels 82 and 83, recesses 95, 96 are provided. Recess 95 is inside the individual labels, whilst recesses 96 are outside the labels and the separating cut along line 90 lies between them. The two edges 63–68 of the strips of labels 80–82 are included in the outline of the relevant labels 97 to 102. The same applies to strips of labels 83 to 85.

FIGS. 5 to 11 show that the invention can be operated with numerous forms of labels, but without any waste occurring from the strip of labels.

I claim:

1. A method of dispensing labels to be glued onto a product, comprising the steps of Conveying a strip of labels which consists only of consecutively arranged labels, without gaps, to a separation site;

separating individual labels from said strip of labels at said separation site, in response to a first signal;

transporting a single separated label from said separation site to a ready position at which the label is held stationary;

detecting the presence of a label at said ready position, and producing said first signal when detecting a change from "label present" to "label absent" state; and in response to a second signal derived from detecting the product on its way to a labelling position, routing the single label from said ready position, past a device for coating the label with adhesive, to said labelling position to be adhered to the product.

* * * * *